United States Patent [19]

McCrum

[11] 4,086,882
[45] May 2, 1978

[54] COMPOUND COMBUSTION ENGINES AND METHODS OF COMPOUNDING SAME

[76] Inventor: William H. McCrum, R.D. #2, Candlewood Mountain Rd., New Milford, Conn. 06776

[21] Appl. No.: 734,638

[22] Filed: Oct. 18, 1976

[51] Int. Cl.² .................... F02B 53/00; F02G 3/02
[52] U.S. Cl. .................... 123/216; 60/620; 60/622; 123/59 EC; 123/217
[58] Field of Search ............... 123/8.05, 59 EC, 8.13; 60/620, 622, 623, 901

[56] References Cited

U.S. PATENT DOCUMENTS

| | | | |
|---|---|---|---|
| 803,623 | 11/1905 | Pollard | 60/622 |
| 1,146,840 | 7/1915 | Bjur | 60/622 |
| 2,113,602 | 4/1938 | Pratt | 123/59 EC X |
| 3,727,594 | 4/1973 | Schultz | 60/620 X |
| 3,817,220 | 6/1974 | Brumm et al. | 123/8.05 |
| 3,903,848 | 9/1975 | Tabaczynski | 123/8.13 |
| 3,924,576 | 12/1975 | Siewert | 123/8.05 X |

*Primary Examiner*—Carlton R. Croyle
*Assistant Examiner*—Michael Koczo, Jr.
*Attorney, Agent, or Firm*—E. Seward Stevens

[57] ABSTRACT

This invention relates to improving the internal combustion and internal use of fuel in engines, and more particularly to engines which are compounded in order to effect extension of the expansion event of the four-event work cycle of such engines which are enabled especially thereby to receive and use, for the furtherance and prolongation of the combustion process, secondary air made available by such engines and/or other means as specified hereinafter, and separately applied to the said combustion process particularly after the ignition of each fuel/air charge or any equivalent thereof.

3 Claims, 13 Drawing Figures

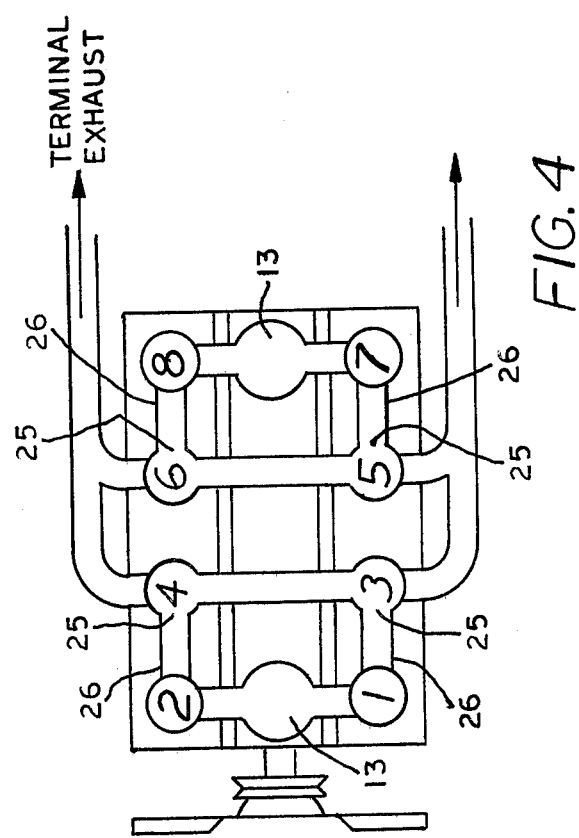

FIG.9

COMPOUND COMBUSTION ENGINES AND METHODS OF COMPOUNDING SAME

The objects of compounding such engines using said secondary air are: to reduce fuel consumption by more effective utilization of heat within the engine which results in a gain in power from the combustion of a given amount of fuel; and to effect more complete combustion of the fuel within the engine so as to reduce effectively the quantity of harmful pollutants normally exhausted.

To satisfy the said objectives, I reasoned that engines require the combination of more time, space and air properly applied to the combustion-expansion process.

Therefore, although compound steam engines are not involved with internal combustion of fuel, certain principles of such prior art are employed as means to effect extension of the expansion event of my internal combustion engine's work cycle, thereby providing for such engine the said extra time and space for the combustion-expansion process.

Furthermore, as the extension of said expansion event involves the transfer of the engine's working medium from one cylinder or equivalent chamber to another, I conceived means for having extra, supplementary air made available to the receiving cylinder or chamber to support the combustion of any unburned combustibles moved thereto by said transfer.

Considerably later, I observed that pages 59, 60 and 61 of the June 1976 issue of Road Test magazine presented information about a 1906 "Compound" automobile containing a three-cylinder compound reciprocating engine of the internal-combustion type. Such magazine information represents the only other prior art known to me as relating even remotely to my invention.

The said magazine stated that the first "Compound" car was produced in 1904, and indicated that 1908 was the last year the "Compound" was manufactured. A search was made for me for the inclusive period 1900 through 1908 but nothing was found relative to such car or engine.

Meanwhile, I concluded that the "Compound's" engine could not actually have anticipated my invention which involves, as new use and a major difference among others, the combination of the compounding principle together with the internal use of secondary air to support fuel combustion and render the same more complete.

While my invention pertains to a number of engines of different type, size or design, I have selected four engines likely to be of most general interest in order to illustrate and explain the process involved and its application to certain engines of varied design.

These engines are: a six-cylinder in-line reciprocating engine; a 90° V-8 cylinder reciprocating engine; a four-rotor rotary engine; and a two-rotor rotary engine. Although these four engines are considered as utilizing a spark-ignition system, the said process also applies to engines using the compression-ignition system.

Referring to the accompanying drawings.

Figure 3A:
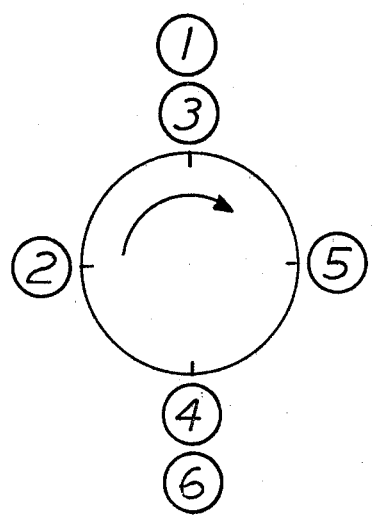

FIG. 3a indicates crankshaft crank positions of six-cylinder compound engine.

Figure 3B:
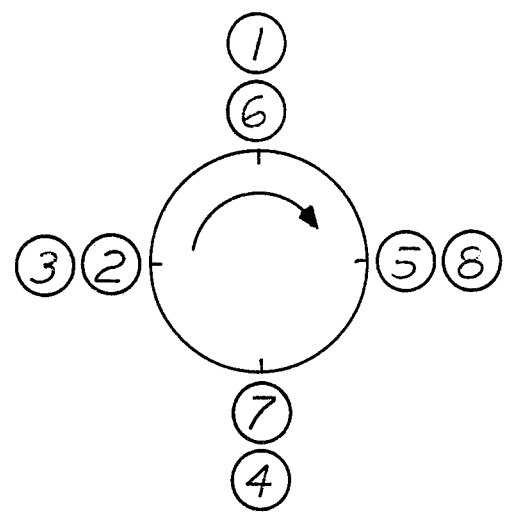

FIG. 3b indicates said crank positions for a V-8 cylinder compound engine.

FIG. 4 is a schematic representation of a V-8 engine using two secondary cylinders in each compounded unit of the invention, one carburetor serving each unit.

Figure 5:
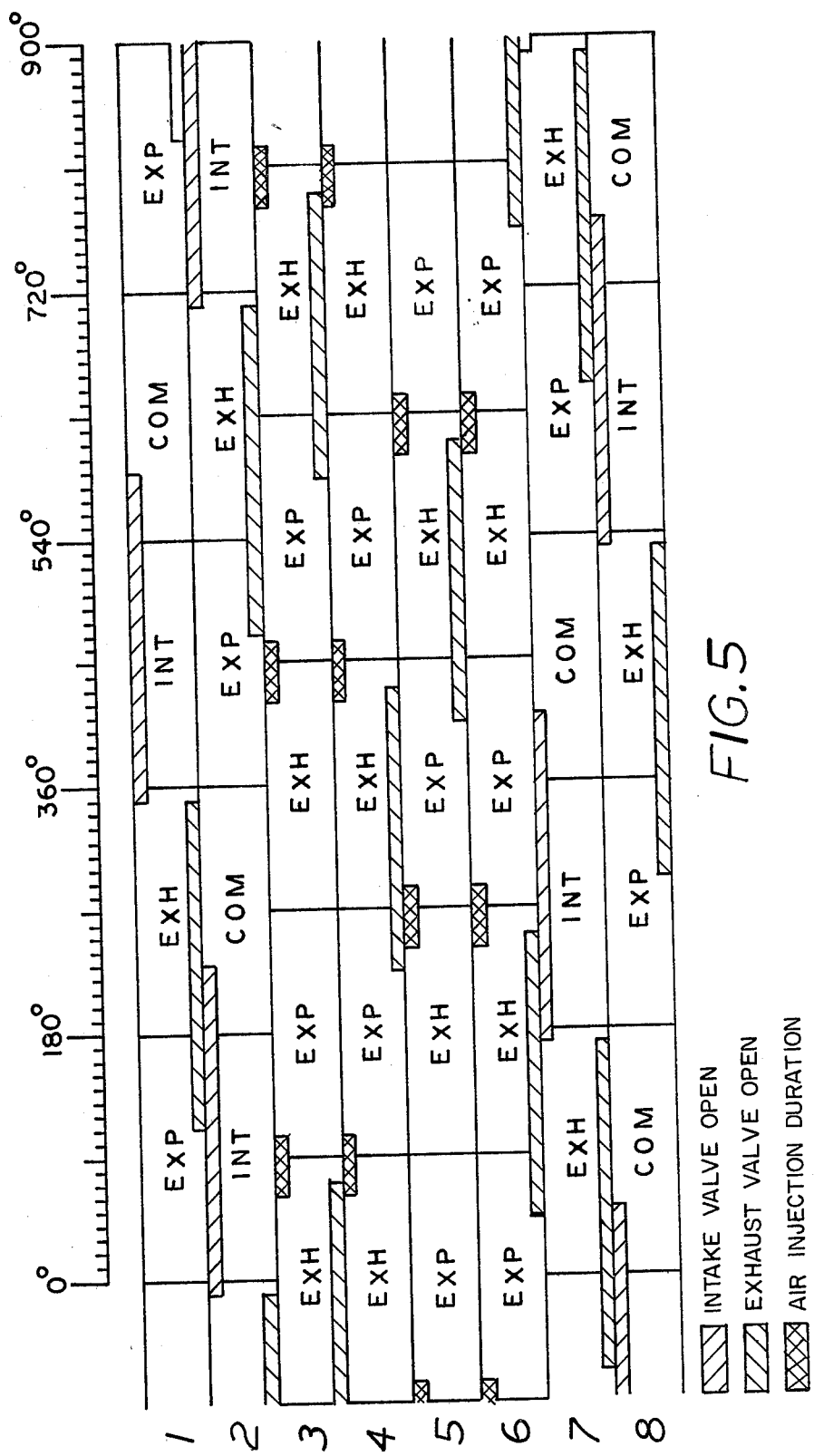

FIG. 5 is a schematic diagram indicating sequence of events of the V-8 engine work cycle of the engine shown in FIG. 4 and duration of valve open time for each individual cylinder.

Figure 6:
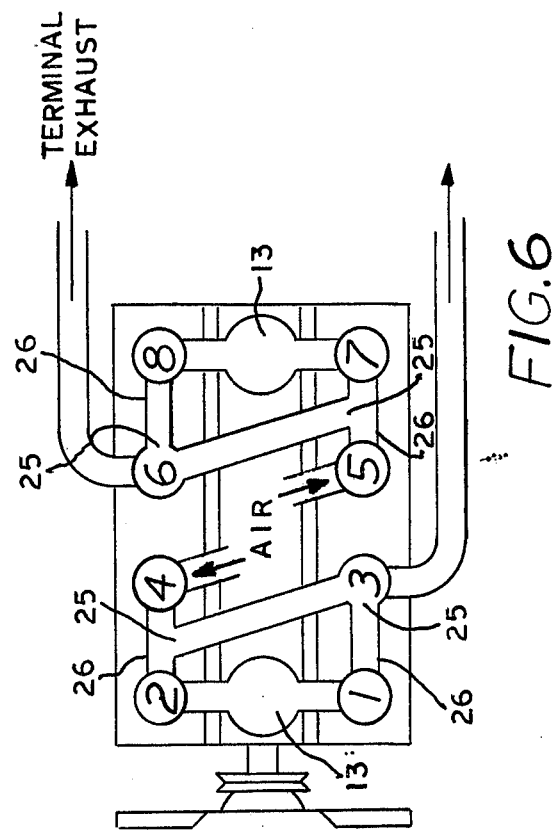

FIG. 6 is a schematic representation of a modification of the V-8 engine shown in FIG. 4, said modification including use of an air cylinder in lieu of one secondary cylinder in each of the two compounded engine sections.

Figure 7:
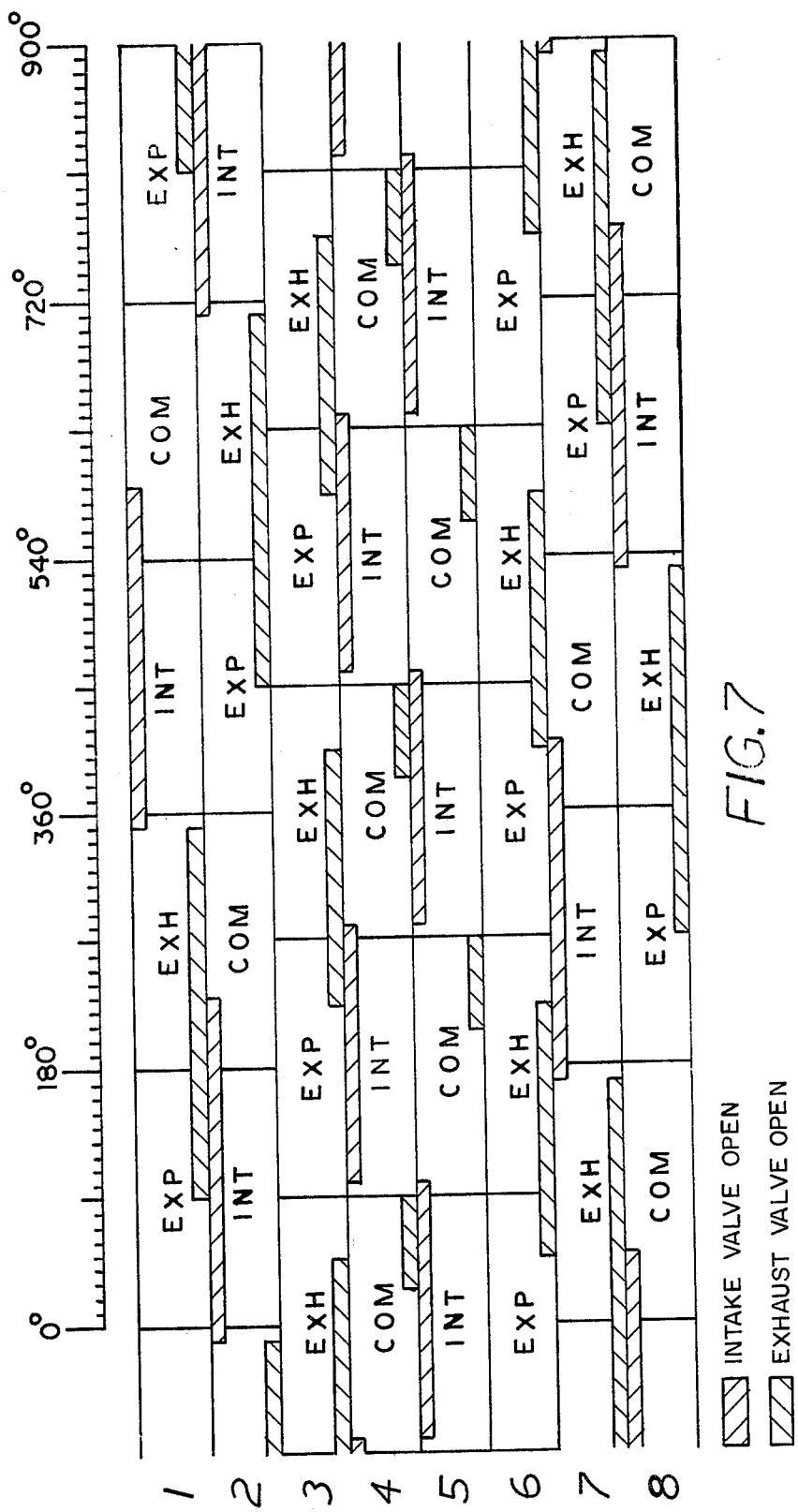

FIG. 7 is a schematic diagram indicating the sequence of events of the V-8 engine work cycle of the engine shown in FIG. 6 and duration of valve open time for each individual cylinder.

Figure 8:
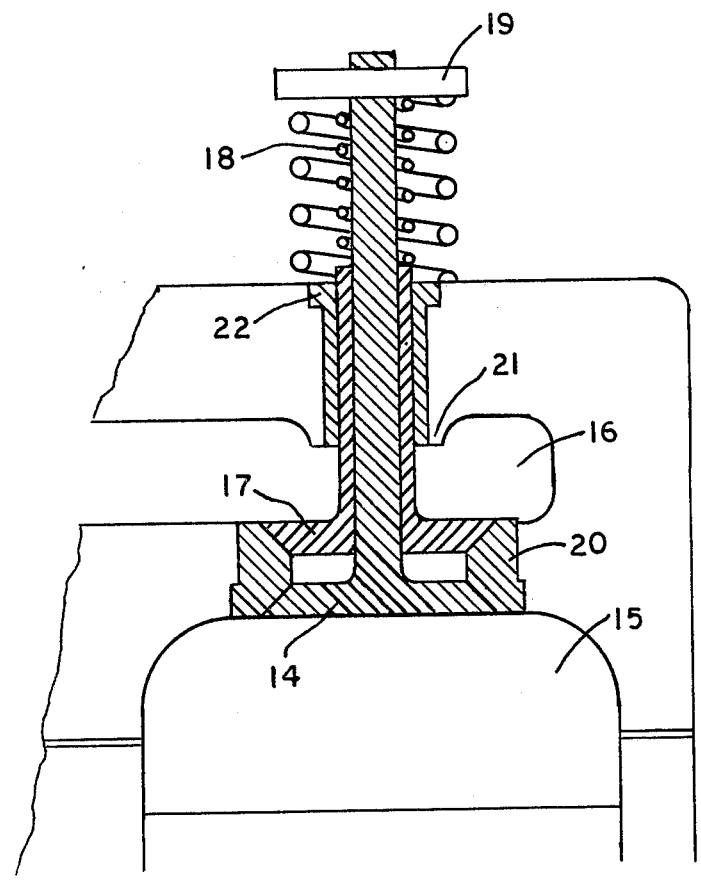

FIG. 8 represents schematically and partly in section, a combination valve and check valve used in compound reciprocating engines to prevent untimely unseating of exhaust valves during sharing and transfer of working medium between inter-connected cylinders.

Figure 9:
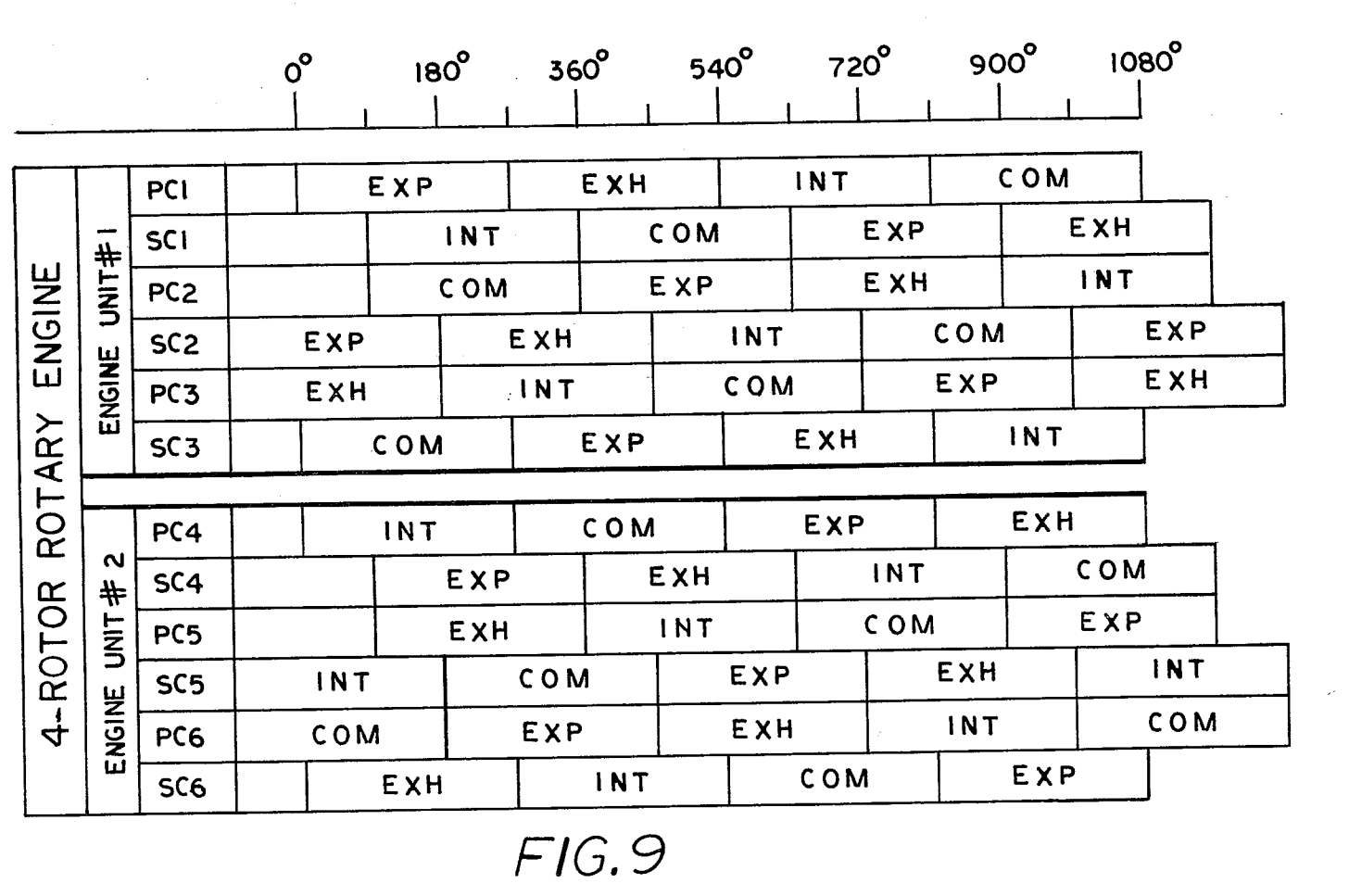

FIG. 9 is a schematic diagram relating to the two separately compounded engine units of my four rotor rotary engine showing the work cycle of each primary and secondary chamber of each of said units.

Figure 10:
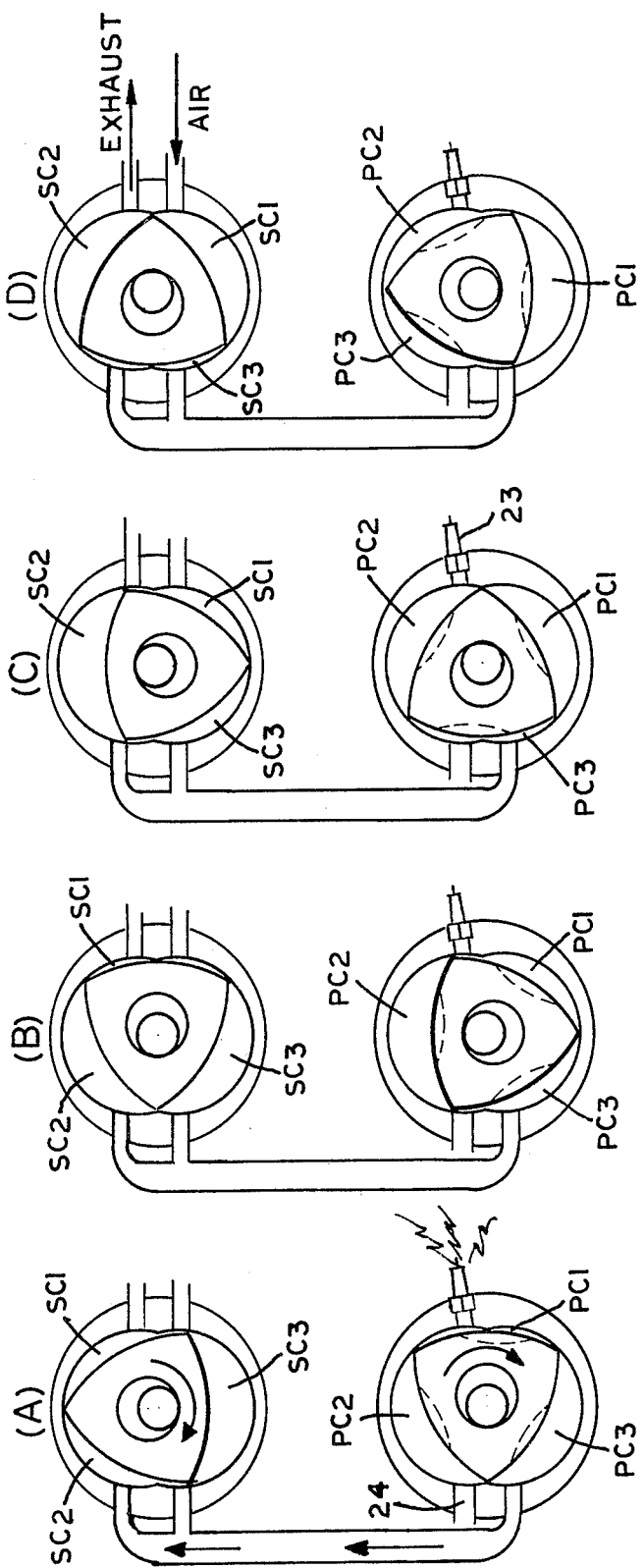

FIG. 10 is a schematic representation of the positions of the rotor and eccentric shaft rotor journal of both primary and secondary sections of one compounded unit of my four rotor compound engine, said positions relating to work cycle events of said engine.

Figure 11:
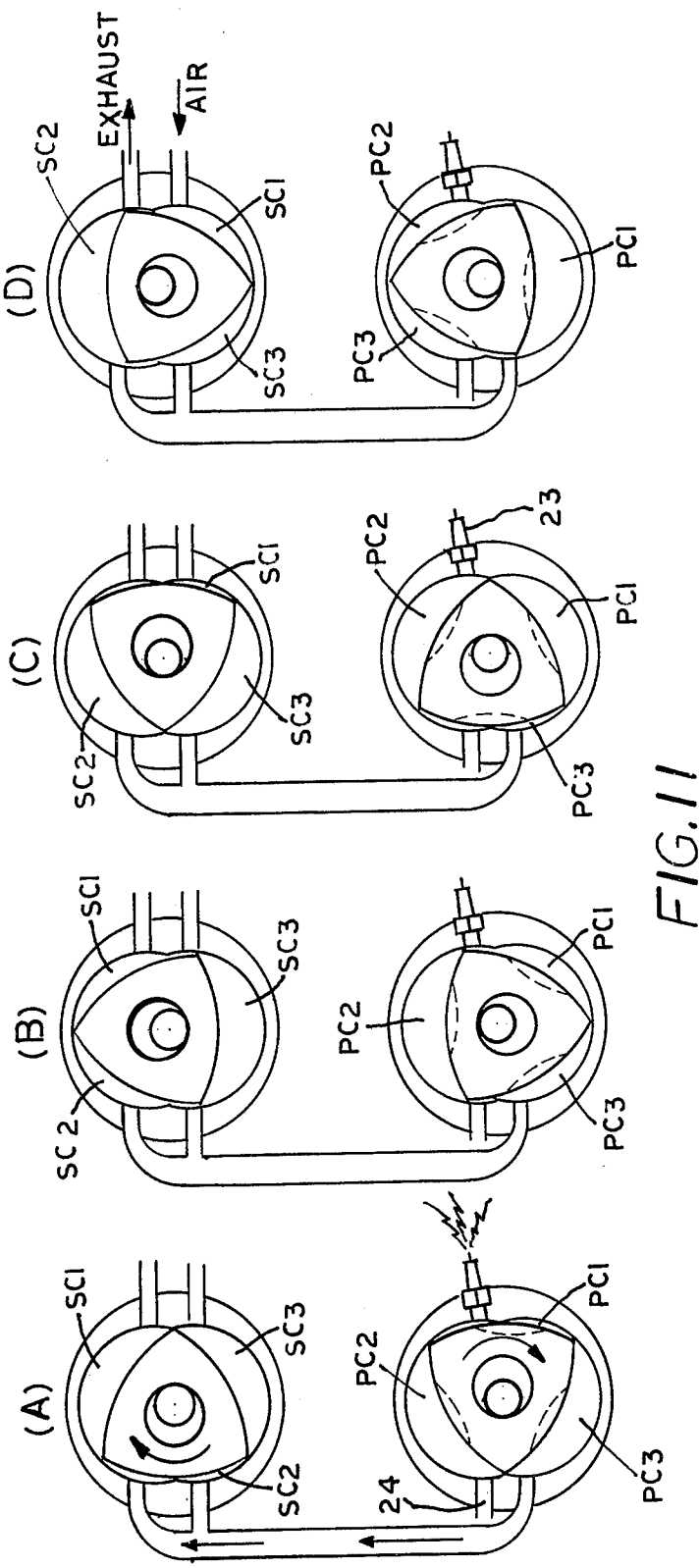
Figure 12:
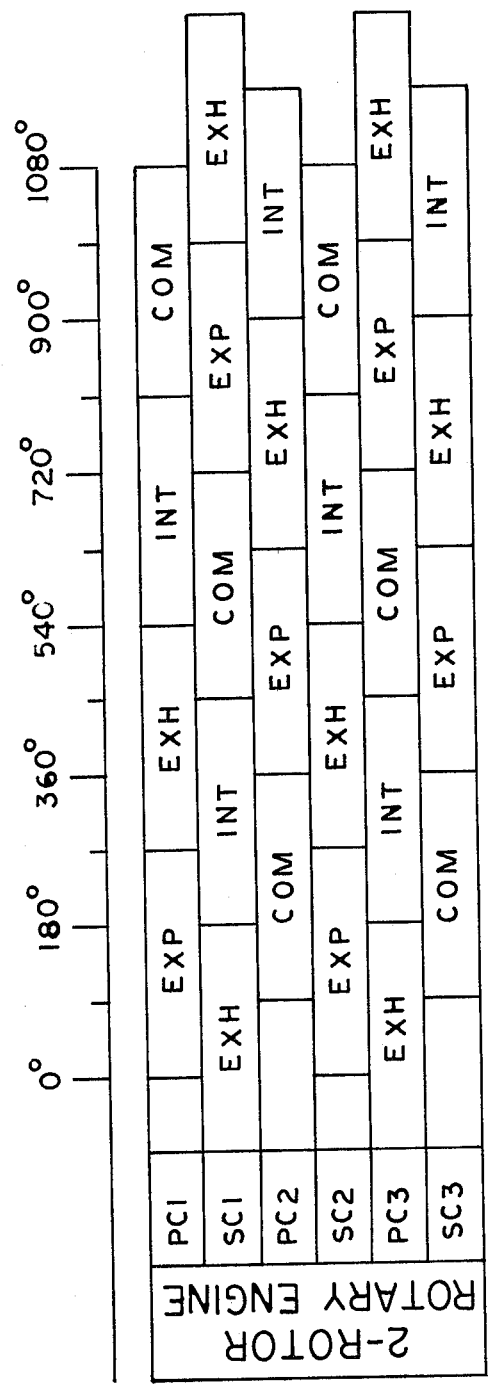
Figure 2:
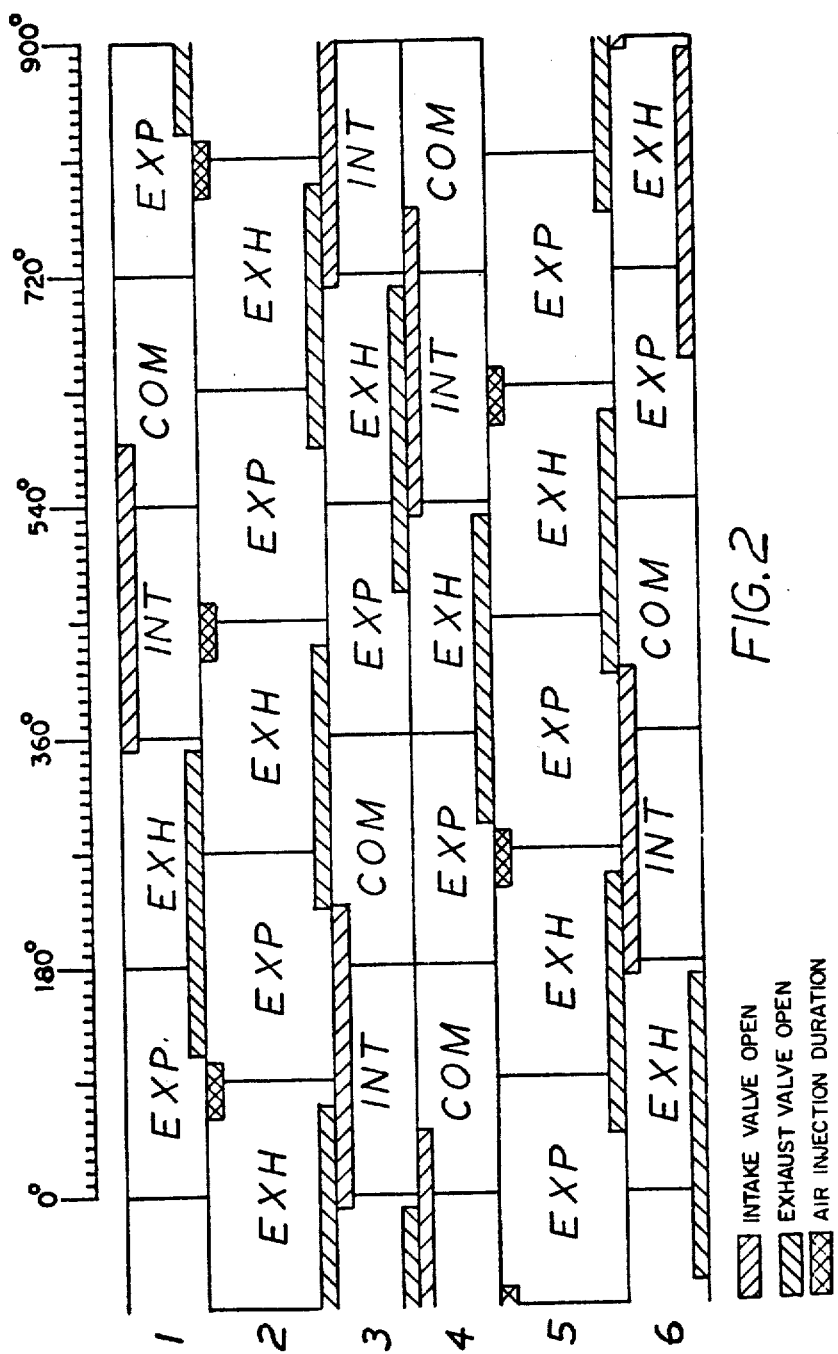

FIG. 11 is a schematic representation of a two rotor compound rotary engine showing rotor and eccentric shaft rotor journal positions relating to the engine's work cycle events indicated on FIG. 12.

FIG. 12 is a schematic diagram relating to my two rotor rotary engine and indicating the work events of each of the indicated primary and secondary chambers of said engine.

The six-cylinder engine comprises four cylinders which I call primary cylinders and which operate according to the work cycle of four events known respectively as intake, compression, expansion and exhaust, necessitating therefore the usual means by which ignition of the fuel/air charge is accomplished therein. Schematic FIG. 1 shows these four cylinders by legend numbers 1, 3, 4 and 6.

Figure 1:
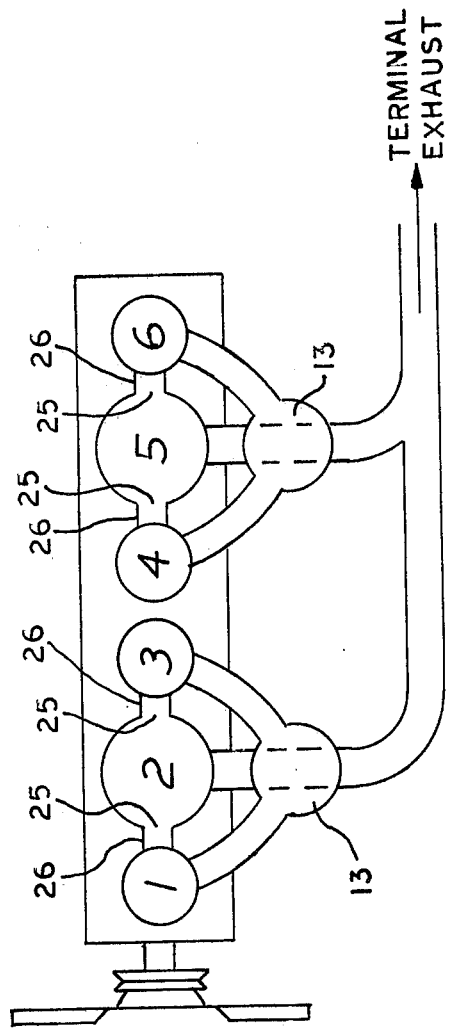
FIG. 1 is a schematic representation of a six-cylinder compound engine.

Each of the secondary cylinders, numbered 2 and 5 on FIG. 1 is provided with two in-cylinder-head valveless ports 25 of in-head conduits 26 leading to the exhaust side of the exhaust valve of each adjacent primary cylinder. These secondary cylinders operate without an ignition system and complete their work cycle in 360° of crankshaft rotation involving only two events which are named respectively herein as expansion and exhaust.

It is significant to note at this point that this engine actually comprises two distant working units, one unit involving cylinders 1, 2 and 3, and the other unit involving cylinders 4, 5 and 6; and to note also that ignition of each fuel/air charge in primary cylinders occurs alternately between said two units.

The charge is ignited in cylinder 1. When exhaust valve opens therein at 110 degrees of crank arm travel from top-center position, which applies to all primary cylinders, the working medium is released to said conduit and shared between cylinders 1 and 2 which sharing continues throughout the exhaust stroke of cylinder 1. Exhaust valve of cylinder 2 opens, as in all secondary cylinders, when crank arm reaches 45° before bottom center, at which time cylinder 2 exhausts through the exhaust manifold to the atmosphere.

Alternately, as aforesaid, ignition occurs next in cylinder 4 which exhausts similarly to cylinder 5. Cylinder 5 later exhausts to atmosphere.

Cylinder 3 fires next; transfers said medium likewise to cylinder 2, which subsequently releases the exhaust. And, finally cylinder 6 fires; shares the working medium with cylinder 5; following which cylinder 5 releases the final exhaust.

From the foregoing explanation, the ignition firing order in primary cylinders appears as 1-4-3-6. The combustion-expansion order is 1-2-4-5-3-2-6-5, the effects of which simulate to some extent the power pulses of a conventional eight-cylinder engine.

Moreover, the said sharing of the working medium between each primary and secondary cylinder team tends to produce, from the combination of cranks concerned with those two cylinders, the unusual equivalent of one crank holding its greatest leverage position throughout the second half of the primary-cylinder expansion event. As the primary crank loses its leverage angle, the secondary crank equally gains the same, thereby improving each power stroke and the power obtained from the ignition and explosion of each fuel-/air charge.

Figure 2:
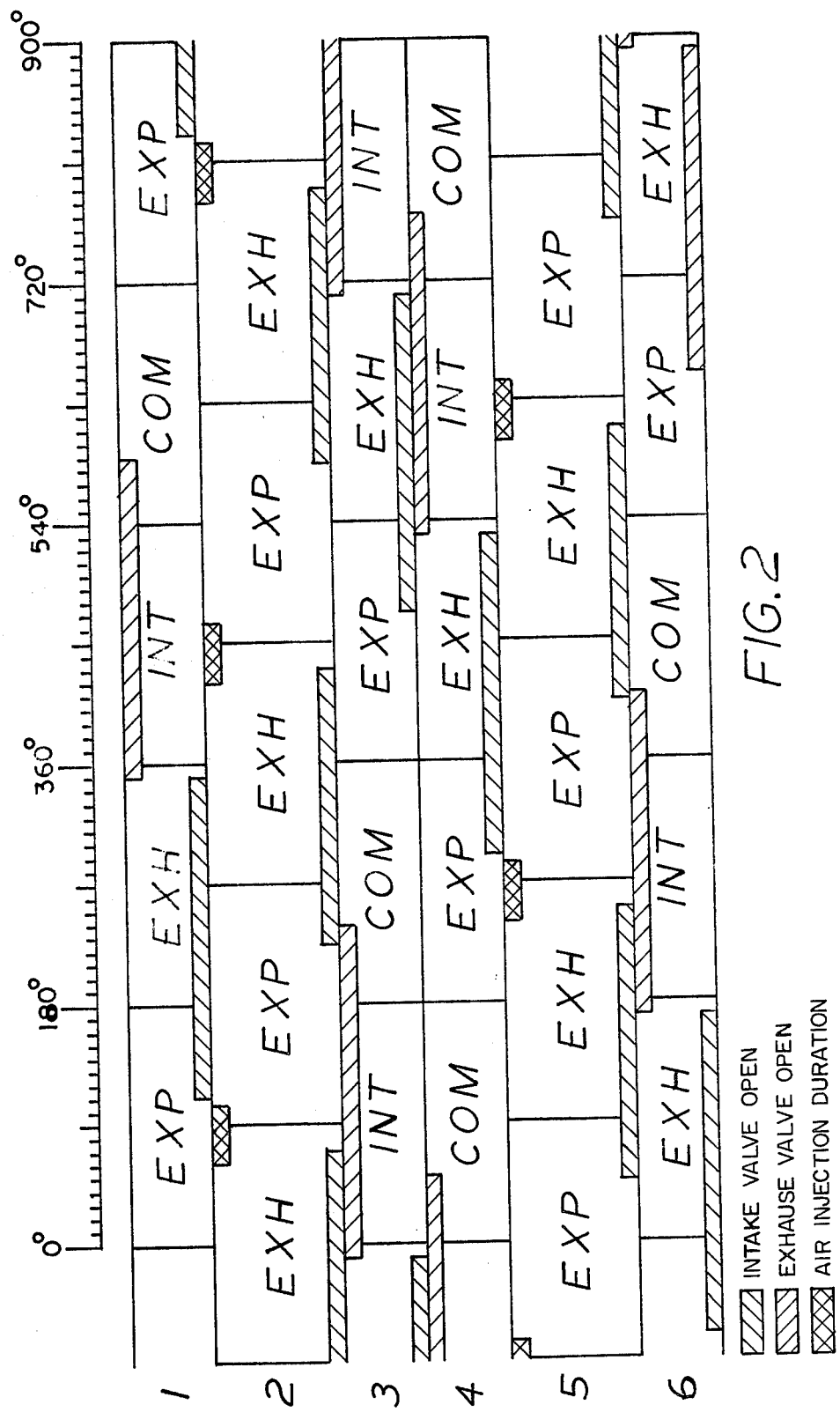
FIG. 2 is a schematic diagram indicatng the sequence of the events of the engine's work cycle - six-cylinder compound engine and duration of valve open time for each indicated cylinder.

FIG. 2 shows the said four events of the stated work cycle, which applies only to the primary cylinders (1,3,4,6) as indicated. Also to be seen thereon are the two events, expansion and exhaust, applying only to the two secondary cylinders (2 and 5) and showing, by 90° of crankshaft rotation indicated by the shown scale, the extension of the expansion event by each teamed pair of primary and secondary cylinders. Release of final exhaust is delayed accordingly.

FIG. 2 indicates primary exhaust valves opening at 70° before bottom center (BBC) and closing at 10° before top center (BTC), at which point the intake valve in each primary cylinder opens, and then closes at 50° after bottom center (ABC).

The compound engine will operate better without the conventional intake-exhaust valve overlap, particularly because of the exhaust gas pressure being shared between primary and secondary cylinders.

Also indicated on FIG. 2 is the duration of the exhaust valve opening in each secondary cylinder, and the period of secondary air injection in crankshaft rotation degrees. Secondary cylinder exhaust valves open at 45° BBC and close 20° BTC. These secondary valves must be opened and closed during each revolution of the crankshaft.

Said secondary air is injected into the concerned secondary cylinder during the crank rotation period commencing 30° BTC, and ending 15° ATC, which allows 5° before the opening of the exhaust valve in the teamed primary cylinder. Said air injection starts 10° before the exhaust valve closes in secondary cylinders, which aids expulsion of the exhaust therefrom.

The injection of secondary air for this engine is to be made available via an external system (not shown) which can be of any of numerous conventional means and which must be capable of supplying a sufficient quantity of suitably compressed air, such as may be contained in an air tank for release to the concerned part of the secondary cylinder system in accordance with the aforementioned timing.

I deem it best to have the secondary air injected simultaneously at two locations with regard to each secondary cylinder's operation. There should be preferably one air port, valve or nozzle (whichever of these is used depends on the type of "external system" selected by the user), located at the primary cylinder end of each aforesaid in-cylinder-head conduit so as to have injected air directed at the exhaust side of the exhaust valve of both interconnected primary cylinders.

In operation, when a secondary-cylinder piston nears the end of its exhaust stroke, the air injected at the exhaust valves of the two adjacent primary cylinders will first serve to expel the residual exhaust gases; and then, when the secondar cylinder exhaust valve closes, the additional air injected will serve in furthering the burning of any still-combustible gases about to come from one of the connected primary cylinders.

FIG. 3a shows crankshaft/crank positions for this six-cylinder engine. Cranks for primary cylinders 1 and 3 are shown at top center position. At bottom center are the cranks for primary cylinders 4 and 6. From the arrow's indication of clockwise rotation of the crankshaft, the crank for secondary cylinder 5 lines up at 90° ATC. The other crank for secondary cylinder 2 is set at 270° ATC. This crank arrangement should satisfyy the engine's staticbalance requirements. The matter of dynamic balance should prove to be solvable, especially in consideration of the following details about cylinder sizes.

Improvement of engine performance as a result of compounding should come to realization, even with all six cylinders having the have the same bore. However, for additional performance improvement the bore of each seconary cylinder in this engine should be so increased as to provide no less a piston-head area per such cylinder than twice the head area of each primary piston, compression therein having far less significance as compared to that in primary cylinders.

Besides the resultant benefits to be obtained thereby, such as bettered power strokes and increased volume for improvement of the combustion-expansion process, the dynamic balancing of the engine should be effected more easily.

As per FIG. 1, I recommend the use of two single-throat carburetors 13, so that each of the two engine units will be served by one carburetor through the shown short, direct and even-length intake manifold ducts. Heat for improving vaporization of fuel can be taken from the exhaust manifold which is shown as running underneath each of the carburetors.

The V-8 -compound engine comprises two banks of cylinders separated by an angle of 90° each bank consisting of four in-line cylinders. As shown on FIG. 4, cylinders 1, 3, 5 and 7 represent one bank of cylinders, and cylinders 2, 4, 6 and 8 the other.

Typical of this compounding process, cylinders are compounded to form distinct engine sections or units. FIG. 4 shows one such unit composed of cylinders 1, 2, 3 and 4. The remaining four cylinders make up the second compounded unit. Personal preference for this arrangement of units and the two types of cylinders so placed in each unit of this V-8 engine arises as one possibility of using the shortest conduits and manifold ducts.

Primary cylinders are 1, 2, 7 and 8 operating according to the cycle of four events previously named. One carburetor 13 is shown to feed cylinders 1 and 2. A second carburetor feeds 7 and 8.

Cylinders 3, 4, 5 and 6 are the secondary cylinders, which require no ignition system and which operate in accordance with the cycle of only two events named expansion and exhaust. Therefore, this cycle is completed in 360° of crankshaft rotation.

Referring to FIG. 4 again, it should be noted that the circles drawn around the cylinder legends 3, 4, 5 and 6 are not fully closed circles. This schematically indicates that there is a constantly-open interconnection between cylinders 3 and 4 by means of conduit connection. Cylinders 5 and 6 are also connected in like manner. These "circles" represent schematically cylinders and cylinders having constant openin to a conduit, or more than one conduit (when a part of such circle is left open at the conduit juncture); and cylinders containing one or more valves, which, in their operation, are shown to be in CLOSED position by the part of the circle drawn between any cylinder legend number and the conduit or manifold otherwise connected to such cylinder. I find such schematic illustration less confusing, quite simple to effectively clarify the understanding of the description given.

As a matter of fact, the particular circles drawn around the cylinder legends 3, 4, 5 and 6 on FIG. 4, purposely are not fully-closed circles, because the open portion of the circle equates with constant opening to the conduit; whereas a full circle would indicate presence of a valve (or some means of closing of the concerned conduit, or cylinder interconnection).

The shown short conduit leading from each primary cylinder to its adjacent secondary cylinder is an in-cylinderhead conduit 26 constantly open at the secondary cylinder end, and closed at the other end whenever the primary cylinder exhaust valve is in closed position.

The closed section of the circle between each secondary cylinder legend number and the final-exhaust manifold connection indicates that each secondary cylinder has its own exhaust valve, which is operated by the same camshaft used for the other cylinders in that cylinder bank. It follows, then, that the exhaust valves of interconnected secondary cylinders alternate in their operation in this engine.

The ignition firing order of primary cylinders is 1-8-2-7, indicating that a fuel/air charge is inducted only by these four cylinders. The compound process creates, in combination with the secondary system, a combustion-expansion order of 1-(3/4)-8-(6/5)-2-(4/3)-7-(5/6).

The latter is best explained by observing FIG. 4 with these comments. Cylinder 1 fires; 1 shares its exhaust directly with 3 which furthers the sharing with 4 and up to the closed exhaust valve of 2; thereafter 4 handles the release of final or terminal exhaust.

Moving alternately to the other engine unit, cylinder 8 fires next; shares its exhaust with 6 and 5 in that order; then 5 releases the exhaust.

Back again to the first unit, cylinder 2 fires; exhaust to 4 and 3; and 3 releases the exhaust. Finally, 7 fires; exhausts to 5 and 6; and 6 ends the compounded cycle by emitting the final exhaust.

For the reasons given, the aforementioned timings of the opening and closing of intake and exhaust valves respectively apply to this compound V-8-engine also.

Similarly, all that was said heretofore about the injection of secondary air into the compound six-cylinder engine applies to this V-8 engine too, provided it is noted that when such air is injected simultaneously at the two recommended spots per injection, said two spots are situated in opposite cylinder banks of the V-8 engine.

Both static balance and dynamic balance of this engine should be no more difficult to accomplish than the same for conventional V-8-engines, since only one and the same bore is recommended for all cylinders of the V-8 compound engine.

The crankshaft crank arm positions for this engine are shown on FIG. 3b whereon it is noted that the cranks for cylinders 1 and 6 are at top center; cranks for 5 and 8 are at 90° ATC; cranks for 4 and 7 are at bottom center; and cranks for 2 and 3 are at 270° ATC. As shown, rotation is clockwise.

Having two secondary pistons operate in the expansion event together with one primary piston, during most of the period of 90° of crankshaft rotation immediately preceding the expansion event of the next-firing primary cylinder, creates the effect of providing in this engine a tripled area of piston-head surface against which the expansing working fluids can act, and thus perform more work.

Consequentially, I expect primary-cylinder power pulses to be less noticeable, and the running of the engine to be smooth.

Also deemed noteworthy is the sizable increase in working-chamber volume made available for the combustion-expansion and the work processes, as well as the extra time allotted thereto for their more-effective completion, before the terminal exhaust event is allowed to occur.

FIG. 5 shows diagrammatically the events of the work cycles of the respective cylinders of the V-8 compound engine just described. Cylinder legend numbers are shown at the left side of the diagram.

Across the top of the diagram is shown a scale of crankshaft rotation in intervals of ten degrees in accordance with which the open-time duration of this engine's valves is indicated.

Attention is directed to the teamed secondary cylinders and the alternation of exhaust valve operation therebetween. Air-injection periods concerning the latter cylinders are shown scalewise to have duration of 45°, each said injection commencing 10° before the closing of the concerned secondary-cylinder exhaust valve.

This V-8-compound engine using same described crank postions, can be made induct and distribute internally the secondary air required for the extension of the combustion-expansion process, without employing the aforementioned external means to supply said air. For such system, the engine would be modified as shown on FIG. 6 and FIG. 7 and as described below.

FIG. 6 shows the same primary cylinders 1, 2, 7 and 8. Only 3 and 6 are used as the secondary cylinders. I call 4 and 5 air-pump cylinders in this particular engine, as these cylinders induct and compress atmospheric air only.

Each cylinder except 3 and 6 has an intake valve. All cylinders have an exhaust valve.

As shown on FIG. 6, the combustion chamber of cylinder 3 is inter-connected by conduits 1 and 2, and is open to either 1 or 2 only when the exhaust valve of 1 or 2 is open. Cylinder 6 relates to 7 and 8 in the same way.

In any one bank of cylinders, the conduits connecting any pair of adjacennt cylinders are in-head conduits.

The conduit 26 between 2 and 4 connects those cylinders at the exhaust side of the exhaust valves therein, so as to have said valves control the control the conduit end ports respectively. This same conduit is also connected to the conduit leading to 3 as aforesaid. Cylinder 5 is connected to 7 and 6 in the same manner.

This engine can be made to operate with one rather than two carburetors. In that case, the intake manifolding would be adjusted accordingly with consideration also given to location or position of the said conduits, which latter should be made to confine the heat therein for internal use and safety purposes.

In this engine's distinctively different operation, as shown on FIG. 7, cylinder 1 fires. Meanwhile, 3 is exhausting the spent fluids or gases, and continues to do so until 45° BTC, when its exhaust valve closes.

Air taken in by and being compressed in cylinder 4 is released to 3 at 65° BTC. The 20° overlap of open exhaust valves in 3 and 4 allows some of the compressed air to expel residue exhaust, following which both 3 and 4 further compress the remaining air to top-center position of pistons in 3 and 4, when latter's exhaust valve closes.

At that point, the exhaust valve of 1 opens to as to share the working medium between 1 and 3. This doubles the piston-head area against which the expanding working medium can act and thus perform more work; brings the hot gases of 1 into contact with the compressed secondary air in 3 which action effectively furthers the combustion process; and tends to produce, from the combination of primary and secondary cylinder cranks as aforesaid, the unusual equivalent of, say, the primary crank holding its greatest-leverage position throughout the second half of the primary-cylinder expansion event. Benefits from the latter were mentioned earlier herein. Final exhaust is ejected by 3.

In the engine's other separate unit, cylinder 8 fires next and, at the midpoint of its expansion event, releases the working fluids to 6 which contains the air just provided by 5, and which later discharges the final exhaust.

Back to the first engine section, 2 fires next and transfers accordingly said fluids to cylinder 3, which cylinder 4 supplied with air. Cylinder 3 removes the exhaust.

Completing the compound cycle, 7 fires next and similarly shares the fluids with 6 and the secondary air therein. After permitting the continued burning of leftover fuel, 6 discards the exhaust.

The timing of the opening and closing of all valves is shown on FIG. 7. For the primary cylinders 1, 2, 7 and 8, the timing previously mentioned remains unchanged concerning the intake valve, and also the closing time of the exhaust valve therein. But the opening time of the latter valve has been advanced so as to open at 90° ATC, which effects earlier sharing of the working medium between teamed pairs of primary and secondary cylinders.

As cylinders 3, 4, 5 and 6 complete their two-event work cycle in 360° of crankshaft rotation, and because of the said earlier sharing of the working fluids, different timing of the concerned valves is recommended as follows.

The exhaust valves of the air-pump cylinders 4 and 5 are shown to open at 65° BTC and to close at top cennter position of each concerned crank. As aforesaid, this opening time provides the 20° said valve overlap which I recommend as a minimum for this engine. Earlier or later opening of these valves may be made at the discretion of others.

The intake valves of cylinders 4 and 5, and the exhaust valves of cylinders 3 and 6, open for a period of 180° of crankshaft rotation; and close for a period of the same interval.

Exhaust valves in 3 and 6 open 45° BBC and close 45° BTC. Intake valves in 4 and 5 open 10° ATC and close 10° ABC.

From this particular engine, for example, I regard the following as some of the important things to be effected: Slightly rich fuel/air mixtures can be used in primary cylinders for purposes of satisfactory ignition of the charge and the lowering of high-peak combustion temperature so as to lessen the formation of nitrogen oxides; the amount of secondary air the engine provides and uses about equals that which is inducted for the primary charge, thus assuring clean burning of the leftover fuel; the total space provided for the combustion-expansion process just about doubles that otherwise available in the conventional engine; and terminal exhaust action is delayed for a period at least equal to 90° of crankshaft rotation, thereby providing more time for combustion, expansion and the use of the fuel inside the engine.

Concerning all compounded reciprocating engines described or referred to herein, it is important to use suitable means which will prevent the possible lifting of any primary-cylinder exhaust valve from its seat as a result of back pressure against the stem-side of said valve head, whenever the working medium is being shared between primary and secondary cylinders during the expansion event of any primary cylinder in the same engine unit. The use of said means applies also to the exhaust valves of the air-pump cylinders 4 and 5. If not done by stronger valve springs, suitable check valves can be made to prevent said lifting.

FIG. 8 shows one type of means by which said exhaust valves can be kept from being unseated by back pressure generated and released by a primary cylinder undergoing its expansion event as aforesaid. This represents a combination exhaust valve and check valve, for example.

In operation the exhaust valve 14 is opened by the conventional rocker arm or equivalent device in accordance with the cam operating and controlling such mechanism, the force to open such valve being applied at that valve's stem end.

The pressurized gas or working medium in the cylinder chamber 15 flows past the opened exhaust valve 14 into the conduit 16 as it unseats the back-pressure check valve 17, which opens in a direction opposite to that of the exhaust valve. The valve seat 20 is inserted to serve both valves.

The shown check-valve spring 18 is compressed by forces from two directions: the force applied by the spring retainer 19 as it moves toward the valve seat 20; and the force applied by the stem end of the check valve 17 as it moves away from the valve seat 20.

Assuming a stem diameter of 0.371 inch for the exhaust valve 14 and an outside diameter of ½ inch for the stem of the check valve 17, the difference between the cross-sectional area of each of said stems approximates 0.088 square inch. Thus, the head area of the check valve 17 at its stem side is 0.088 square inch less than that of the head's other side, as regards exposure of said head to the pressure of the working medium in said conduit 16.

The latter area differential is useful in determining the compression strength required of the check-valve spring, which should seat the check valve at a minimal pressure of 2 to 3 pounds.

Assuming for example, a gas pressure of 200 PSI in the conduit with the cehck valve open, the pressure at the head end of that valve would be 17.6 pounds greater than that at the other side of the same valve head (200 × 0.088 = 17.6).

Where the exhaust valve and check valve open, say, a maximum of ⅜ inch each, the check-valve spring will have been compressed ⅜ inch beyond that ot its valve-seating compression-length measurement, at which point the spring's pressure or energy should at least equal the aforementioned 17.6 pounds, per said gas pressure.

In any case, the head of the check valve should not be allowed to pound or strike against the valve-guide boss 21 or the end of the valve guide 22 itself. This can be prevented by suitable clearance space and by the use of a check-valve spring having compression strength slightly exceeding that which counterbalances the maximum expected pressure to which said conduit will be exposed.

By the time said exhaust valve closes, the force of thhe flowing gas ejected from the concerned cylinder will have decreased enough to allow the check valve to close. The seated check valve is then in position to resist back pressure generated by any other cylinder connected by conduit therewith.

As the exhaust valve of each air-pump cylinder is also subject to the said back pressure use of the same combination valve or other suitable means is recommended for such cylinders.

The four-rotor internal-combustion compound rotary engine is proposed to replace the conventional two-rotor engine and is so formed as to consist of two distinct engine units, each unit containing two rotors. FIG. 9 shows the manner in which the units are separated and the composition of each.

Each unit comprises a primary engine section, and a secondary engine section, each section containing one rotor, and each rotor has three flanks or working faces which provide the means, during rotor rotation, by which operating chambers are formed, and operating events of the respective work cycles are effected.

The primary sections operate in accordance with the usual work cycle consisting of four events named in the order of occurrence as intake, compression, expansion and exhaust. For the reason that the original ignition of fuel/air charge takes place only in each primary section, all said flanks of the rotor therein contain a recessed area which is considered as forming part of a combustion chamber.

Not requiring combustion chambers as such, the secondary sections contain plain-faced or non-recessed rotors for the reason, as will be recognized later, that the working fluids will already have reached the burning state by the time said fluids, in or from a primary operating chamber (PC), enter and act in any secondary operating chamber (SC), or any two of the latter.

The secondary sections are not equipped with an ignition system, so combustibles are expected to burn therein without the violent explosive effect associated with the expansion event in the primary sections.

The primary-section intake event involves the intake of a fuel/air mixture which I call the charge; whereas the intake event of secondary sections concerns the intake of only supplementary air which I call secondary air, and which, in being compressed therein by rotor rotation, is forced into and made available to the already ignited charge to improve the combustion thereof. By its rotation, the rotor forces the air our of the secondary section air chamber into the conduit (and hence another chamber).

The events of the named cycle are common to both engine units, but are arranged so as to have like events occur alternately and evenly between said units, as shown on FIG. 9. To achieve such alternation of events, proper engine balance, and occurrence of work events suitable to said four-rotor engine, the eccentric shaft or power shaft is made to have four journals which, in operation, act like crankshaft crank journals.

Viewing said eccentric shaft from its front end, and assuming clockwise rotation of said shaft, the journal set at top center position will serve the primary-section rotor in engine unit #1. The journal at bottom center, set on the vertical line at an angle of 180° from the latter journal, works in conjunction with the primary section rotor in engine unit #2. These two rotors are set onto their respective journals so as to have the events concerned therewith occur in opposite-phased manner, such as, respectively, expansion versus intake, compression versus exhaust, et cetera, as shown in detail on FIG. 9.

The eccentric shaft journal located at 270° ATC (after top center), viewed as aforesaid, works in connection with the secondary section rotor in engine unit #1. And the fourth journal, set at 90° ATC, operates with the secondary section rotor in engine unit #2. Opposite phasing of the events between and concerning the latter two rotors is required also, as shown clearly on FIG. 9.

Since both of said units operate alike, even though the work events are phased oppositely, the compounding process together with the functions and performance of both engine units can be readily understood by the study of one of the compounded units, such as is shown on FIG. 10 where the eccentric shaft is assumed to join and run between both of the indicated engine sections.

Under (A) on FIG. 10, ignition is taking place in PC 1 as spark plug 23 fires. As can be seen on, and determined from FIG. 10 at (A), the eccentric of the secondary section is in the direction of 12 o'clock, affording, therefore, the maximum of leverage angle to the force of the working medium in SC2, as such force is applied to that particular flank of the rotor in this particular position. Such force applied to the eccentric at this point is definitely positive, in that the eccentric is thus driven in the direction of rotation. Through the shown conduit, PC 3 is exhausting to SC2, which is favored by a better, more effective position of the eccentric-shaft rotor journal for providing the extra power output derived from the working-substance transfer. PC2 is taking in a fuel/air charge through the intake port 24. SC 1 is releasing terminal exhaust and has just opened the air-intake port. SC 3 is ready to start the compression and release of its secondary air to the conduit.

Under (B), the eccentric shaft has rotated clockwise 90°. PC 1 is in the expansion event. SC 1 is completing its expulsion of exhaust from one chamber and taking air into the air chamber. The air in SC 3 is mixing with the working fluids that have suddenly entered SC 3, because of the momentary pressure differential between the fluids; and further mixing with the fluids still coming from PC 3 as well as with those in SC 2, which is continuing its expansion event. The said pressure-differential is soon equalized, following which fluids in SC 3 are transferred to SC 2 with little or no negative effect on rotor movement. PC 2 is starting its compression event.

Under (C), said shaft has rotated 90° more. Expansion is continuing in PC 1. SC 1 has completed its exhaust event and is taking in more air. PC 3 has practically completed its exhaust event and is set for its intake of a fresh charge. PC 2 is compressing its charge. SC 3 is still moving air or the burning gases into the conduit and also into SC 2 through the port which is properly positioned to allow such fluid flow. SC 2 is now in position to start its exhaust and to begin closing the port at the left which admits the working medium.

Under (D), after 90° more rotation of said shaft, PC 3 is taking in its fresh charge and PC 2 is compressing its charge. SC 2 is exhausting and SC 1 continues to take in secondary air. PC 1 is ready to let its exhaust shoot into SC 3, where the rotor will exert additional force on the eccentric shaft to keep it revolving.

For present purposes, there appears to be no need for any further tracing of work-cycle events of FIG. 10, although the same can be done, if desired, by starting again at (A) and rotating just the PC and SC numbers clockwise to the next chamber. For example PC 3 is replaced by the number PC 1 which then applies to that shown chamber.

It is seen on FIG. 9 that the period of each event is equivalent to 270° of eccentric shaft rotation; and that certain events occurring in each engine unit coincide in timing, though not by like events, in that particular unit. Certain patterns thereby become apparent and useful in the reading of that chart and the understanding of the compounding process, as well as how this engine's power is increased without using any additional fuel.

PC 1 sends first the major part of its exhaust to SC 3, and the remainder to SC 1 later. Therefore, the PC 1 expansion event is coupled directly with that of SC 3 wherein expansion is continued without interruption for 270° longer thereby doubling the length and the period of the expansion event. This likewise extends the period for combustion of fuel, and also tends to improve the engine's overlapping of expansion events which effects a consequential increase in engine power with smoother engine performance.

It is seen also, along this path, that a certain part of the original exhaust has been delayed from entering the atmosphere by a period of 270 additional degrees of said shaft rotation. All this helps to improve the combustion process and quality of the engine's exhaust.

In like manner, PC 2 expansion transfers to SC 1 expansion; PC 3 expansion goes on to SC 2 expansion, and so on. Since the expansion event is generally the power event, the way in which this engine's power is developed throughout the engine can be observed on FIG. 9 by following the mentioned pattern.

As to the balance or remainder of the exhaust from PC 1, another different pattern example comes forth. Said balance is transferred at or about the midpoint of the PC 1 exhaust event to SC 1 during the air compression event of SC 1. That is a good time for such transfer, because a momentary internal pressure drop occurs as the secondary air at lesser pressure begins to mix with the working fluids. Furthered combustion takes place as supported by such air. Thus the pattern is developed locating on FIG. 9 the midpoint of the exhaust event applying to each primary chamber of the engine. At each of such midpoints the working fluids are connected with the air compression event underway in the secondar chamber bearing the same number, such as PC1 to SC 1, PC 2 to SC 2, and so forth.

It is well worthwhile to note that such latter portion of the burning charge, originally ignited at the start of the PC 1 expansion event, will remain inside the engine, and be given the chance to continue burning therein, during the uncommonly long period equivalent to 900° of eccentric shaft rotation, before the ejection of said portion to the atmosphere commences.

It should be noticed that secondary air is provided without the need of an external pump to supply such air; that there appears to be no need for an exhaust gas recirculation system, a thermal reactor, or other such external device to be attached to the exhaust system; and that the width of all rotors and chamber should be equal in this engine, although the width of the secondary rotors and chambers may be made greater than the same of the primary section, where engine balance is maintainable.

It is expected further that this compound engine's terminal exhaust will require less muffling of sound therefrom.

The two-rotor internal combustion compound rotary engine is proposed to replace the conventional single-rotor rotary engine. This compound engine comprises two distinct engine sections, one of which I call primary section and the other the secondary section.

Here, too, an ignition system is provided for use only in and by the primary section, which necessitates, therefore, the recessing of the three flanks of only the primary rotor for combustion-chamber purposes. The flanks of the seconary rotor are to remain plain and without such recess.

The eccentric shaft in this engine has two crank journals on which the rotors revolve and operate to crank and rotate the shaft. Viewed from one end of the shaft, the crank journals are seen separated from each other by an angle of 180° so as to have, say, one journal at the top and the other at the bottom end of the vertical diameter of the journals' rotation circle. As can be seen at (D) on FIG. 11, the rotors are set onto the journals of the common shaft so as to have the rotors operate in opposite phases. This provides proper engine balance, primarily.

The operation of this compound engine is illustrated by FIG. 11 to the extent necessary for comprehension of the timing and performance of the work-cycle events, the way in which the four-event cycle is effected in each of said engine sections, and the differences in the use of the cycle by the primary section as compared with the same regarding the secondary section.

FIG. 11 pictures the clockwise rotation of the eccentric shaft and both rotors thereon, as well as the positions of rotors and shaft rotor journals at intervals of 90 degrees of shaft rotation, as the process progresses from (A) through (D).

At (A), ignition of the fuel/air charge is occurring in PC 1 where spark plug 23 is shown firing. PC 2 is taking in its charge through the intake port 24. SC 1 is ejecting terminal exhaust. SC 3 is inhaling its secondary air. PC 3 is exhausting through the shown conduit to SC 2, which is in a good position, rotorwise and shaft-journal-wise, to receive and share the working medium from PC 3. Said sharing will actually double the time period for the combustion and use of the fuel.

Construction of the conduit should be such as to provide an internally-casted passageway aligned within and between both housing castings, so as to allow working medium flow between the primary and secondary sections; or said conduit may be mounted externally and made as a manifold or of proper heavy-duty tubing, preferably stainless steel tubing suitably flanged or fitted for secure and tight connection to the rotor housings. The intended meaning is that the "passageway" (the conduit) is within and part of the housing of the primary and secondary sections, so as to have passageway continuity between said sections permitting, therefore, the flow of medium from primary to secondary section.

At (B) of FIG. 11, PC 1 is continuing its expansion event. PC 2 is in position to start its compression event. PC 3 is still moving the working medium to SC 2, which is continuing its expansion. SC 1 is continuing its exhaust event, the rotor having just opened also the air intake port. And SC 3 is ready to start sharing its secondary air via the conduit with the working medium in the conduit, SC 2 and PC 3, said air intake port then closed to such chamber, SC 3. It should be noted that the air taken in and supplied supplementarily by the secondary section at least equals the amount of air taken in by the primary in the latter's original intake events. This doubling of the amount of usable air, when used as specified, consequentially creates the unusual and highly effective means by which combustion of the fuel is greatly improved within the engine, especially, as compared with the current practice of afterburning the leftover fuel in a thermal reactor or catalytic converter, for example.

Going on at (C) on FIG. 11, PC 1 continues expansion. PC 2 is compressing its charge. PC 3 has about completed exhaustng, and is starting its intake of a fresh fuel/air charge. SC 1 is completing the final-exhaust event, and is taking in air. SC 2 is yet undergoing expansion and participating in the secondary-combustion process. And SC 3, in its compression event, is engaged in supplying air to further the combustion-expansion process.

At (D) on FIG. 11, the eccentric shaft has rotated 270 degrees since ignition occurred in PC 1. SC 1, having completed its final-exhaust event, is taking in a supply of secondary air. PC 3 is inducting a fresh fuel/air charge through intake port 24, and PC 2 is compressing its charge. SC 2 has completed its expansion event and is ready to start exhausting its air-treated working medium which SC 3 will continue to treat with air until the rotor closes the SC 2 working-medium intake port, such port closure period involving about only 30 degrees more rotation of the eccentric shaft. Thereafter, SC 3 will force the remainder of its air into the conduit and the exhaust therein from PC 1, such air-treated working medium then being received by SC 3 through said medium intake port.

Noting in particular the three expansion events shown on FIG. 12 for PC 1, PC 2 and PC 3, and more particularly the respective positions of such events on that diagram, it can be noted readily that a gap of 90° of eccentric shaft rotation exists between any two of these expansion events. That situation is typical of the operation of the conventional single-rotor engine.

Therefore, with both rotors of equal width, the chief gains to be realized from the two-rotor compounded engine come from the extension and prolongation of the primary-section expansion events via the extra time and space provided by and within the engine through the interconnection of the said events and secondary-air compression events under way in secondary-section chambers.

This tends generally to more than double the length in time of the fuel-combustion and expansion periods. Thus, the combustion process is made better. In addition, the release of terminal exhaust to the atmosphere is delayed accordingly, by the movement of the working medium from primary to seconary chambers.

The latter becomes clear by observing on FIG. 12 the PC 1 expansion event, for example, which is seen ending at 270° on the eccentric shaft rotation scale. At that point, the working medium is treated by secondary air from SC 3 which builds up the combustion of leftover fuel in PC 1, and SC 2 for about 30 more degrees of shaft rotation. This action bridges to some extent the mentioned gap by carrying the process into the expansion event of SC 3. Along this route, exhaust to atmosphere does not begin until 630° of shaft rotation after the original ignition of the PC 1 charge at or around the zero-degree line on said scale.

I believe it is important to note that during the PC 1 exhaust event, for example again, some of the fluids therein are treated by secondary air in and from SC 1 at or around the point 495° on said scale. This treatment continues separately for about 135° of shaft rotation. Then at the 630° mark, fluids from PC 2 seek out the SC 1 air. Along this path, some of the exhaust from both PC 1 and PC 2 starts leaving the engine from SC 1 at the 990° point on said scale.

From the foregoing examples, the explained patterns of operation can be applied in the full reading of the FIG. 12 diagram.

An increase of the width of only the secondary rotor should provide the means by which the working medium, shared between primary and secondary chambers, can be made to increase the power output of this two-rotor compound engine. The pressure of said fluids would then be applied more effectively, powerwise, against the wider flanks of the secondary rotor.

It is known publicly that the balancing of rotors in such rotary engines can be accomplished by flywheel balancing and by suitable conterweights attached to or made integral with the eccentric shaft. Therefore, the difference in the weights of rotors of different widths can be eliminated or cancelled out by the use of said balancing means.

The invention is not to be construed as limited to the particular engines and forms disclosed herein, since these are to be regarded as illustrative rather than restrictive, any limitation being to the claimed process and structure and reasonable equivalents.

What I claim is:

1. A two rotor internal-combustion compound rotary engine comprising, in combination:
   a) a primary engine section and a secondary engine section operatively connected by an eccentric shaft as the power shaft common to both said sections, the primary section serving as the prime mover in the manner of a conventional single-rotor rotary engine operating according to the known four-event work cycle;
   b) a three-flanked rotor connected to said power shaft and rotatably contained in each said section for effecting work-cycle events;
   c) a two-lobed housing cavity contained in each said engine section serve as the operating chamber for the respective rotor during rotation thereof;

d) an ignition system connected only to the primary section for ignition of rich fuel/air charges therein;

e) means for supplying fuel and primary air only to the primary section;

f) a recess in each of the three flanks of the primary rotor, each recess forming part of a moving combustion chamber;

g) a secondary rotor with non-recessed flanks for substantially preventing transfer of gases between the lobes of the secondary rotor's two-lobed housing cavity;

h) a short conduit for connecting and thereby compounding adjacent primary and secondary sections for transferring working medium exhausted by the primary section to the secondary section;

i) eccentric shaft rotor journals oppositely positioned by a separation angle of 180° for rotors to be mounted thereon so as to be oppositely-phased in their operation;

j) secondary rotor housing provided with an air intake port and an air outlet port disposed oppositely and peripherally in one lobe of said two-lobed housing cavity, said intake port connected to a conventional air-filter system and said outlet port connected to said conduit whereby the secondary engine section's rotor is enabled to induct supplemental secondary air through said air-filter system during each intake event in said one lobe and cause ejection of said air directly into said conduit and working medium during each compression event in said one lobe to support the burning of leftover combustibles in said medium; and said k) secondary rotor housing also provided with a peripheral inlet port in the other lobe of said cavity and connected to said conduit for admitting therefrom the air-treated said working medium during each expansion event in said other lobe; said housing additionally provided with a peripheral exhaust port disposed in the opposite side of said other lobe for release of the spent medium during successive exhaust events into an exhaust system connected to said exhaust port.

2. A four-rotor internal-combustion compound rotary engine comprising, in combination:

a) primary engine sections and secondary engine sections operatively connected by an eccentric shaft as the power shaft common to all said sections, each primary section serving as a prime mover in the manner of a conventional single-rotor rotary engine operating according to the known four-event work cycle;

b) a three-flanked rotor connected to said power shaft and rotatably contained in each said section for effecting work-cycle events;

c) a two-lobed housing cavity contained in each said engine section to serve as the operating chamber for the respective rotor during rotation thereof;

d) an ignition system connected only to each primary section for ignition of rich fuel/air charges therein;

e) means for suppying fuel and primary air only to the primary sections;

f) a recess in each of the three flanks of each primary rotor, each recess forming part of a moving combustion chamber;

g) each secondary rotor with non-recessed flanks for substantially preventing transfer of gases between the lobes of the respective secondary rotor's two-lobed housing cavity;

h) two short conduits each for connecting and thereby compounding one primary section and one adjacent secondary section to form one compound engine unit, and for transferring working medium exhausted by the primary section to the secondary section in the same unit;

i) eccentric shaft rotor journals positioned radially around the axis of said eccentric shaft at 90° separation angles for the different rotors to be mounted alternately thereon whereby like rotors are oppositely phased in their operation;

j) each secondary rotor housing provided with an air intake port and an air outlet port disposed oppositely and peripherally in one lobe of the respective said two-lobed housing cavity, said intake ports connected to a conventional air-filter system and each said outlet port connected to the respective said conduit whereby each secondary section's rotor is enabled to induct supplemental secondary air through said air-filter system during each intake event in the respective said one lobe, and cause ejection of said air directly into the respective said conduit and working medium during each successive compression event in that same lobe to support the burning of leftover combustibles in said medium; and k) each secondary rotor housing also provided with a peripheral inlet port in the other lobe of the respective said two-lobed cavity and connected to the respective conduit for admitting therefrom the air-treated working medium during each expansion event in the respective said other lobe; each said secondary housing additionally provided with a peripheral exhaust port disposed in the opposite side of the respective said other lobe for release of the spent medium during successive exhaust events into an exhaust system connected to said exhaust ports.

3. An internal combustion compound rotary engine containing at least two rotors and comprising, in combination:

a) primary engine sections and secondary engine sections arranged side-by-side in pairs of unlike sections and operatively connected by an eccentric shaft serving as the power shaft common to all said sections, each primary section serving as a prime mover in the manner of a conventional single-rotor rotary engine operating according to the known four-event work cycle;

b) a three-flanked rotor connected to said power shaft and rotatably contained in each said section for effecting work-cycle events;

c) a two-lobed housing cavity contained in each said engine section to serve as the operating chamber for the respective rotor during rotation thereof;

d) means for supplying primary air and fuel only to the primary sections, and in quantities effecting ignitable fuel-rich mixtures therein;

e) ignition means for igniting said mixtures in said primary sections;

f) each primary rotor having conventional design with a conventional recess in each flank, said recess forming part of a moving combustion chamber as that rotor rotates;

g) each secondary rotor differing from primary rotors only by having non-recessed flanks which coactively participate with the peripheral surface of the respective said cavity in substantially preventing transfer of gases between the lobes of that cavity;

h) short gas-transfer conduits each separately connecting and thereby compounding one primary section and one adjacent secondary section to form one compound engine unit thereof, each conduit serving as a passageway for direct transfer or working medium held at high temperature and pressure as it is exhausted by the primary section to the secondary section in the same unit;

i) eccentrics of said eccentric shaft serving as rotor journals arranged for rotors to be rotatably mounted thereon and effect, during their rotation, equal spacing of the respectiive expansion events of the said four-event work cycle;

j) each secondary rotor housing provided with an air intake port and an air outlet port disposed oppositely and peripherally in one lobe of the respective said two-lobed housing cavity, said intake ports connected to a conventional air-filter system and each said outlet port connected to the respective said conduit whereby each secondary section's rotor is enabled to induct supplemental secondary air through said air-filter system during each intake event in the respective said one lobe, and cause ejection of said air directly into the respective said conduit and working medium during each successive compression event in that same lobe to support the burning of leftover combustibles in said medium; and k) each secondary rotor housing also provided with a peripheral inlet port in the other lobe of the respective said two-lobed cavity and connected to the respective conduit for admitting therefrom the air-treated working medium during each expansion event in the respective said other lobe; each said secondary housing additionally provided with a peripheral exhaust port disposed in the opposite side of the respective said other lobe for release of the spent medium during successive exhaust events into an exhaust system connected to said exhaust ports.

* * * * *

UNITED STATES PATENT OFFICE
CERTIFICATE OF CORRECTION

Patent No. 4,086,882           Dated May 2, 1978

Inventor(s) William H. McCrum

It is certified that error appears in the above-identified patent and that said Letters Patent are hereby corrected as shown below:

IN THE DRAWINGS

In Fig. 2, delete from the bar the equivalent of the last 10°.

In Fig. 2, the legend showing the intake valve open and the exhaust valve open should be reversed.

In Fig. 2, "exhause" should be --exhaust--.

Column 2, line 60, "distant" should read --distinct--.
Column 4, line 16, "secondar" should read --secondary--.
          line 27, "satisfyy" should read --satisfy--.
Column 5, line 15, "openin" should be --opening--.
Column 6, line 22, "expansing" should read --expanding--.
          line 63, after "conduits" insert --cylinders--.
          line 68, "adjacennt" should read --adjacent--.
Column 7, line 3,  delete --the control--.
          line 64, "cennter" should read --center--.
Column 9, line 4,  "cehck" should read --check--.
          line 24, "thhe" should read --the--.
Column 10, line 3, "our" should read --out--.
Column 12, line 1, "secondar" should read --secondary--.
Column 14, line 8, "seconary" should read --secondary--.

UNITED STATES PATENT OFFICE
CERTIFICATE OF CORRECTION

Patent No. 4,086,882             Dated May 2, 1978

Inventor(s) William H. McCrum

It is certified that error appears in the above-identified patent and that said Letters Patent are hereby corrected as shown below:

Column 14, line 67, after "section" insert --to--.
Column 15, line 60, "suppying" should read --supplying--.
Column 17, line 7, "or" should be deleted.

Signed and Sealed this

Twenty-fourth Day of October 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,086,882            Dated May 2, 1978

Inventor(s) William H. McCrum

It is certified that error appears in the above-identified patent and that said Letters Patent are hereby corrected as shown below:

FIG. 2 should be deleted and substituted with the attached FIG. 2 therefore.

Column 2, line 60, "distant" should read --distinct--.
Column 4, line 16, "secondar" should read --secondary--.
         line 27, "satisfyy" should read --satisfy--.
Column 5, line 15, "openin" should be --opening--.
Column 6, line 22, "expansing" should read --expanding--.
         line 63, after "conduits" insert --to cylinders--.
         line 68, "adjacennt" should read --adjacent--.
Column 7, line 3 , delete --the control--.
         line 64, "cennter" should read --center--.
Column 9, line 4 , "cehck" should read --check--.
         line 24, "thhe" should read --the--.
Column 10, line 3, "our" should read --out--.
Column 12, line 1, "secondar" should read --secondary--.
Column 14, line 8, "seconary" should read --secondary--.
Column 14, line 67, after "section" insert --to--.
Column 15, line 60, "suppying" should read --supplying--.
Column 17, line 7 , "or" should read --of--.

THIS CERTIFICATE SUPERSEDES CERTIFICATE OF CORRECTION ISSUED OCTOBER 24, 1978.

Signed and Sealed this

Third Day of April 1979

[SEAL]

Attest:

RUTH C. MASON
Attesting Officer

DONALD W. BANNER
Commissioner of Patents and Trademarks